United States Patent
Goto (10) Patent No.: US 12,014,535 B2
(45) Date of Patent: Jun. 18, 2024

(54) SYSTEM, CLIENT APPARATUS, DATA PROCESSING METHOD, COMPUTER PROGRAM AND RECORDING MEDIUM

(71) Applicant: NEC Corporation, Tokyo (JP)

(72) Inventor: Yoshiyuki Goto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 326 days.

(21) Appl. No.: 17/437,239

(22) PCT Filed: Feb. 17, 2020

(86) PCT No.: PCT/JP2020/006048
§ 371 (c)(1),
(2) Date: Sep. 8, 2021

(87) PCT Pub. No.: WO2020/189133
PCT Pub. Date: Sep. 24, 2020

(65) Prior Publication Data
US 2022/0172454 A1    Jun. 2, 2022

(30) Foreign Application Priority Data
Mar. 19, 2019  (JP) ................................. 2019-051317

(51) Int. Cl.
*G06V 10/74* (2022.01)
*G06T 7/73* (2017.01)
(Continued)

(52) U.S. Cl.
CPC .............. *G06V 10/761* (2022.01); *G06T 7/74* (2017.01); *G06V 10/75* (2022.01); *G06V 10/762* (2022.01)

(58) Field of Classification Search
CPC .... G06V 10/761; G06V 10/75; G06V 10/762; G06V 40/172; G06T 7/74; G06F 21/6218; G06F 16/285; H03M 7/30; G06N 20/00
See application file for complete search history.

(56) References Cited

U.S. PATENT DOCUMENTS 6,253,203 B1   6/2001  O'Flaherty et al.
6,275,824 B1   8/2001  O'Flaherty et al.
(Continued)

FOREIGN PATENT DOCUMENTS

CN    109344742 A    2/2019
JP    2007-257248 A    10/2007
(Continued)

OTHER PUBLICATIONS

International Search Report for PCT Application No. PCT/JP2020/006048, dated Jun. 9, 2020.

*Primary Examiner* — Md K Talukder (57) ABSTRACT

A system is a system including: a cloud server configured to perform a machine learning process; and a client apparatus configured to communicate with the cloud server. The client apparatus includes: a generating unit that generates one or a plurality of reference data from a plurality of data used for the machine learning and that generates a plurality of difference data, wherein the reference data is a reference for at least a part of the plurality of data, and each difference data indicates a difference between each of the plurality of data and corresponding reference data out of the one or the plurality of reference data; and a storage unit that stores the plurality of difference data in a storage apparatus of the cloud server.

6 Claims, 5 Drawing Sheets

(51) Int. Cl.
*G06V 10/75* (2022.01)
*G06V 10/762* (2022.01)

(56) References Cited

U.S. PATENT DOCUMENTS

| | | | |
|---|---|---|---|
| 2007/0266261 A1* | 11/2007 | Nishiguchi | H04L 9/085 |
| | | | 713/193 |
| 2010/0316265 A1* | 12/2010 | Nakanowatari | G06V 40/172 |
| | | | 382/118 |
| 2016/0019254 A1* | 1/2016 | Vijayrao | G06F 16/235 |
| | | | 707/737 |
| 2016/0155136 A1* | 6/2016 | Zhang | G06Q 30/0201 |
| | | | 705/7.29 |
| 2016/0335017 A1* | 11/2016 | Itoh | G06F 21/602 |
| 2018/0247650 A1 | 8/2018 | Lu et al. | |
| 2019/0020477 A1* | 1/2019 | Antonatos | H04L 9/0894 |
| 2021/0049347 A1 | 2/2021 | Zhao et al. | |
| 2021/0295168 A1* | 9/2021 | Xu | G06F 17/18 |
| 2022/0172454 A1* | 6/2022 | Goto | G06F 21/6218 |
| 2022/0383194 A1* | 12/2022 | Idesawa | G06N 20/00 |

FOREIGN PATENT DOCUMENTS

| | | |
|---|---|---|
| JP | 2007-304962 A | 11/2007 |
| JP | 4588142 B2 | 11/2010 |
| JP | 4590048 B2 | 12/2010 |
| JP | 2014-142871 A | 8/2014 |
| JP | 2017-211689 A | 11/2017 |
| JP | 2018-514100 A | 5/2018 |
| JP | 2018-190239 A | 11/2018 |

\* cited by examiner

SYSTEM, CLIENT APPARATUS, DATA PROCESSING METHOD, COMPUTER PROGRAM AND RECORDING MEDIUM

This application is a National Stage Entry of PCT/JP2020/006048 filed on Feb. 17, 2020, which claims priority from Japanese Patent Application 2019-051317 filed on Mar. 19, 2019, the contents of all of which are incorporated herein by reference, in their entirety.

TECHNICAL FIELD

The present invention relates to a system, a client apparatus included in the system, a data processing method in the system, a computer program and a recording medium.

BACKGROUND ART

A Cloud service such as an IaaS (Infrastructure as a Service) may be used for a machine learning process. A Cloud service provider takes a security measure such as, for example, an encryption of a communication path and a storage encryption. However, for example, due to a human error or the like of the provider, there is a risk of a leakage of user information. For this reason, a user needs to take a measure in preparation for the information leakage, for example, by transmitting data with his own encryption to the cloud service.

As a technique in preparation for the information leakage, for example, a technique described in a Patent Literature 1 is proposed. In the technique described in the Patent Literature 1, first, data DT0 is divided into n pieces of distributed information, then, a secret distribution that allows the data DT0 to be restored by k (1<k<n) pieces of distributed information of the n pieces of distributed information is performed, and the k pieces of distributed information generated by the secret distribution are stored in different storage apparatuses. Then, data DT1, which are generated by editing the data DT0 restored from the k pieces of distributed information, is divided into n pieces of edited distributed information. Then, a difference is calculated between the distributed information stored in each storage apparatus and the corresponding edited distributed information, and the corresponding edited distributed information and a plurality of differences related to a plurality of edited distributed information other than the corresponding edited distributed information are stored in each storage apparatus. There are Patent Literatures 2 to 5 as other related techniques.

CITATION LIST

Patent Literature

Patent Literature 1: JP 2007-304962A
Patent Literature 2: JP 2014-142871A
Patent Literature 3: JP 2017-211689A
Patent Literature 4: JP 4590048B
Patent Literature 5: JP 4588142B

SUMMARY OF INVENTION

Technical Problem

In the technique described in the Patent Literature 1, the cloud services are not considered, and there is room for improvement.

In view of the above-described problems, it is therefore an example object of the present invention to provide a system, a client apparatus, a data processing method, a computer program and a recording medium that are configured to carry out a security measure in preparation for an information leakage without depending on a cloud service provider.

Solution to Problem

A system according to an example aspect of the present invention is a system including: a cloud server that is configured to perform a machine learning process; and a client apparatus that is configured to communicate with the cloud server, the client apparatus including: a generating unit that generates one or a plurality of reference data from a plurality of data used for the machine learning and that generates a plurality of difference data, wherein the reference data is a reference for at least a part of the plurality of data, and each difference data indicates a difference between each of the plurality of data and corresponding reference data out of the one or the plurality of reference data; and a storage unit that stores the plurality of difference data in a storage apparatus of the cloud server.

A client apparatus according to an example aspect of the present invention is a client apparatus that is configured to communicate with a cloud server that is configured to perform machine learning process, the client apparatus including: a generating unit that generates one or a plurality of reference data from a plurality of data used for the machine learning and that generates a plurality of difference data, wherein the reference data is a reference for at least a part of the plurality of data, and each difference data indicates a difference between each of the plurality of data and corresponding reference data out of the one or the plurality of reference data; and a storage unit that stores the plurality of difference data in a storage apparatus of the cloud server.

A data processing method according to an example aspect of the present invention is a data processing method in a system including: a cloud server that is configured to perform machine learning process; and a client apparatus that is configured to communicate with the cloud server, the data processing method including: a generating step in which one or a plurality of reference data is generated from a plurality of data used for the machine learning and a plurality of difference data are generated, wherein the reference data is a reference for at least a part of the plurality of data, and each difference data indicates a difference between each of the plurality of data and corresponding reference data out of the one or the plurality of reference data; and a storage step in which the plurality of difference data are stored in a storage apparatus of the cloud server.

A computer program according to an example aspect of the present invention allows a computer to execute the data processing method according to the example aspect described above.

A recording medium according to an example aspect of the present invention is a recording medium on which the computer program according to the example aspect described above is recorded.

Advantageous Effects of Invention

According to the system, the client apparatus, the data processing method, the computer program, and the recording medium in the respective example aspects described above, it is possible to carry out a security measure for an information leakage without depending on a cloud service provider.

DESCRIPTION OF EXAMPLE EMBODIMENTS

An example embodiment of a system, a client apparatus, a data processing method, a computer program and a recording medium will be described with reference to the drawings. The following describes the example embodiment of a system, a client apparatus, a data processing method, a computer program and a recording medium, by using a system 1 that includes: a cloud server that is configured to perform a machine learning process; and a client apparatus that is configured to communicate with the cloud server.

Configuration

Figure 1:
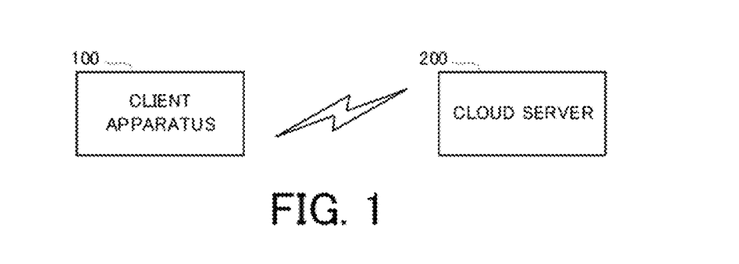
FIG. 1 is a block diagram illustrating a configuration of a system according to an example embodiment.

A configuration of the system 1 according to the example embodiment will be described with reference to FIG. 1 to FIG. 4. First, an overall configuration of the system 1 will be described with reference to FIG. 1. FIG. 1 is a block diagram illustrating the configuration of the system according to the example embodiment. In FIG. 1, the system 1 includes a client apparatus 100 and a cloud server 200. The client apparatus 100 is configured to communicate with the cloud server 200.

Figure 2:
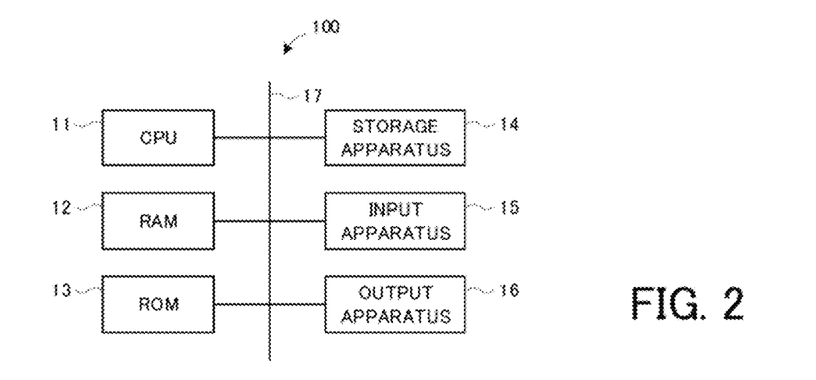
FIG. 2 is a block diagram illustrating a hardware configuration of a client apparatus according to the example embodiment.

Next, a hardware configuration of the client apparatus 100 will be described with reference to FIG. 2. FIG. 2 is a block diagram illustrating the hardware configuration of the client apparatus according to the example embodiment.

In FIG. 2, the client apparatus 100 includes a CPU (Central Processing Unit) 11, a RAM (Random Access Memory) 12, a ROM (Read Only Memory) 13, a storage apparatus 14, an input apparatus 15, and an output apparatus 16. The CPU 11, the RAM 12, the ROM 13, the storage apparatus 14, the input apparatus 15 and the output apparatus 16 are interconnected through a data bus 17.

The CPU 11 reads a computer program. For example, the CPU 11 may read a computer program stored by at least one of the RAM 12, the ROM 13 and the storage apparatus 14. For example, the CPU 11 may read a computer program stored in a computer-readable recording medium, by using a not-illustrated recording medium reading apparatus. The CPU 11 may obtain (i.e., read) a computer program from a not illustrated apparatus disposed outside the client apparatus 100, through a network interface. The CPU 11 controls the RAM 12, the storage apparatus 14, the input apparatus 15, and the output apparatus 16 by executing the read computer program. Especially in this example embodiment, when the CPU 11 executes the read computer program, a logical functional block for encrypting a plurality of data used for a machine learning (which will be described later in detail) is implemented in the CPU 11. In other words, the CPU 11 is configured to function as a controller for encrypting the plurality of data used for the machine learning. A configuration of the functional block implemented in the CPU 11 will be described in detail later with reference to FIG. 4.

The RAM 12 temporarily stores the computer program to be executed by the CPU 11. The RAM 12 temporarily stores the data that are temporarily used by the CPU 11 when the CPU 11 executes the computer program. The RAM 12 may be, for example, a D-RAM (Dynamic RAM).

The ROM 13 stores a computer program to be executed by the CPU 11. The ROM 13 may otherwise store fixed data. The ROM 13 may be, for example, a P-ROM (Programmable ROM).

The storage apparatus 14 stores the data that are stored for a long term by the client apparatus 100. The storage apparatus 14 may operate as a temporary storage apparatus of the CPU 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the client apparatus 100. The incoming apparatus 15 may include, for example, at least one of a keyboard, a mouse, and a touch panel.

The output apparatus 16 is an apparatus that outputs information about the client apparatus 100, to the outside. For example, the output apparatus 16 may be a display apparatus that is configured to display the information about the client apparatus 100.

Figure 3:
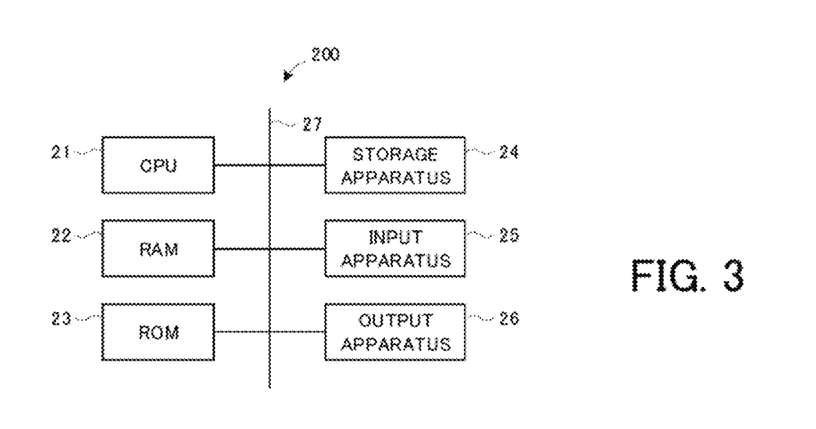
FIG. 3 is a block diagram illustrating a hardware configuration of a cloud server according to the example embodiment.

Next, a hardware configuration of the cloud server 200 will be described with reference to FIG. 3. FIG. 3 is a block diagram illustrating the hardware configuration of the cloud server according to the example embodiment.

In FIG. 3, the cloud server 200 includes a CPU 21, a RAM 22, a ROM 23, a storage apparatus 24, an input apparatus 25, and an output apparatus 26. The CPU 21, the RAM 22, the ROM 23, the storage apparatus 24, the input apparatus 25 and the output apparatus 26 are interconnected through a data bus 27.

The CPU 21 reads a computer program. For example, the CPU 21 may read a computer program stored by at least one of the RAM 22, the ROM 23 and the storage apparatus 24. For example, the CPU 21 may read a computer program stored in a computer-readable recording medium, by using a not-illustrated recording medium reading apparatus. The CPU 21 may obtain (i.e., read) a computer program from a not illustrated apparatus disposed outside the cloud server 200, through a network interface. The CPU 21 controls the RAM 22, the storage apparatus 24, the input apparatus 25, and the output apparatus 26 by executing the read computer program. Especially in this example embodiment, when the CPU 21 executes the read computer program, a logical functional block for performing machine learning process and for decrypting the plurality of data used for the machine learning (which will be described later in detail) is implemented in the CPU 21. In other words, the CPU 21 is configured to function as a controller for performing the machine learning process and for decrypting the plurality of data used for the machine learning. A configuration of the functional block implemented in the CPU 21 will be described in detail later with reference to FIG. 4.

The RAM 22 temporarily stores the computer program to be executed by the CPU 21. The RAM 22 temporarily stores the data that are temporarily used by the CPU 21 when the CPU 21 executes the computer program. The RAM 22 may be, for example, a D-RAM.

The ROM 23 stores a computer program to be executed by the CPU 21. The ROM 23 may otherwise store fixed data. The ROM 23 may be, for example, a P-ROM.

The storage apparatus 24 stores the data that are stored for a long term by the cloud server 200. The storage apparatus 24 may operate as a temporary storage apparatus of the CPU 21. The storage apparatus 24 may include, for example, at least one of a hard disk apparatus, a magneto-optical disk apparatus, an SSD, and a disk array apparatus.

The input apparatus 25 is an apparatus that receives an input instruction from an administrator of the cloud server 200. The incoming apparatus 25 may include, for example, at least one of a keyboard, a mouse, and a touch panel.

The output apparatus 26 is an apparatus that outputs information about the cloud server 200, to the outside. For example, the output apparatus 26 may be a display apparatus that is configured to display the information about the cloud server 200.

Figure 4:
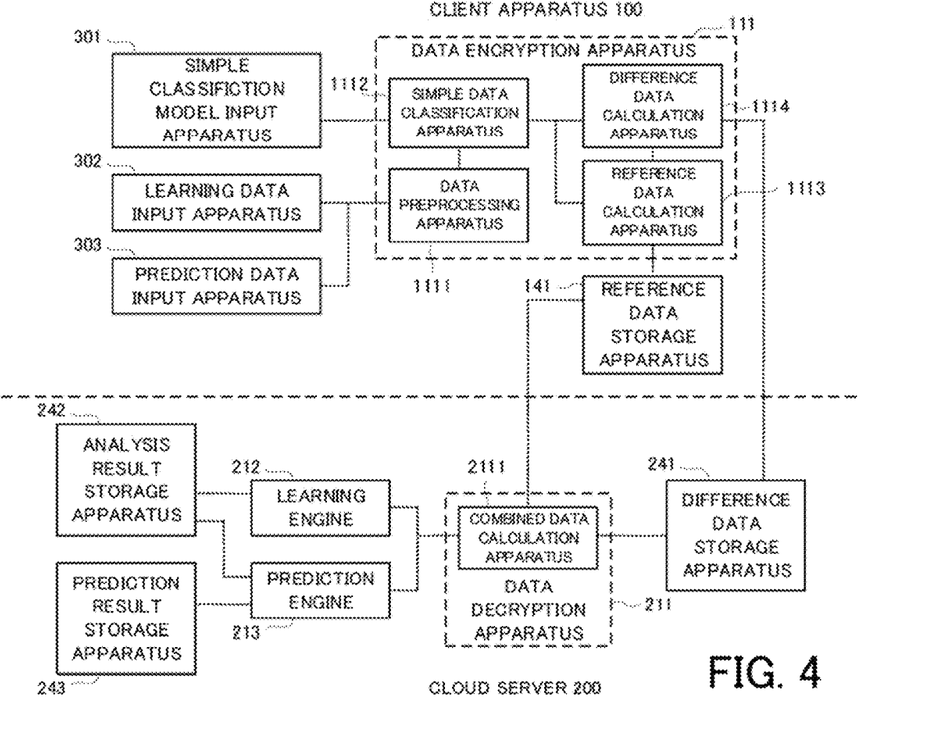
FIG. 4 is a block diagram illustrating a functional block implemented in a CPU of each of the client apparatus and the cloud server according to the example embodiment.

Next, the configurations of the functional blocks implemented in the CPU 11 and the CPU 21 will be described with reference to FIG. 4. FIG. 4 is a block diagram illustrating the functional block implemented in the CPU of each of the client apparatus and the cloud server according to the example embodiment.

In FIG. 4, in the CPU11 of the client apparatus 100, a data encryption apparatus 111 is implemented as the logical functional block for encrypting the plurality of data used for the machine learning. The data encryption apparatus 111 includes a data preprocessing apparatus 1111, a simple data classification apparatus 1112, a reference data calculation apparatus 1113, and a difference data calculation apparatus 1114.

In the CPU21 of the cloud server 200, a data decryption apparatus 211, a learning engine 212, and a prediction engine 213 are implemented as the logical functional block for performing the machine learning process and for decrypting the plurality of data used for the machine learning. The data decryption apparatus 211 includes a combined data calculation apparatus 2111.

As illustrated in FIG. 4, in this example embodiment, the data encryption apparatus 111 is disposed in the client apparatus 100 in an On-Premises environment, while the data decryption apparatus 211 is disposed in the cloud server 200.

Incidentally, in FIG. 4, a simple classification model input apparatus 301, a learning data input apparatus 302, and a prediction data input apparatus 303 are apparatuses that are different from the client apparatus 100. Each of the simple classification model input apparatus 301, the learning data input apparatus 302, and the prediction data input apparatus 303 may be realized, for example, by a personal computer or the like in the On-Premises environment. The client apparatus 100, the simple classification model input apparatus 301, the learning data input apparatus 302, and the prediction data input apparatus 303 may be connected to communicate with each other via a local network.

The data preprocessing apparatus 1111 of the data encryption apparatus 111 performs a predetermined data preprocessing on learning data and prediction data that are obtained from the learning data input apparatus 302 and the prediction data input apparatus 303, respectively. When the learning data and the prediction data are image data, there are a contrast correction, an alignment, a rotational correction and the like as the predetermined preprocessing, for example.

The simple data classification apparatus 1112 classifies each of the learning data or the prediction data by category, by using a model for a data classification that is obtained from the simple classification model input apparatus 301. Note that the model for the data classification may be a model disclosed on the Internet, or a model generated by the machine learning process in the past.

Figure 5:
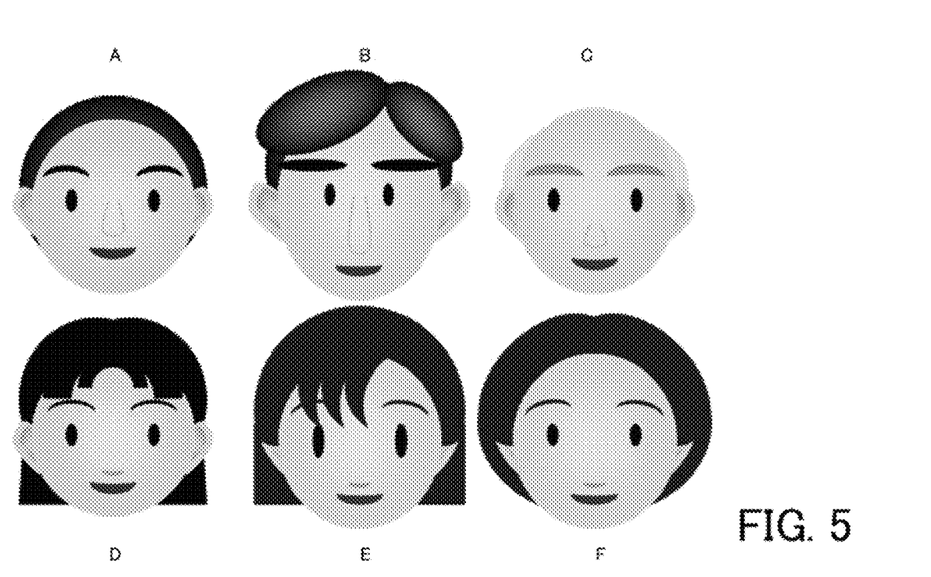
FIG. 5 is a diagram illustrating an example of input data.

For example, when six face images A to F illustrated in FIG. 5, which are input data as the learning data or the prediction data, are inputted to the simple data classification apparatus 1112, the simple data classification 1112 may classify the face images A to F into male face images A, B and C, and female face images D, E, and F.

The reference data calculation apparatus 1113 calculates reference data by category, from each of the learning data or the prediction data classified by category. The reference data is a reference for a plurality of data classified into one category. Such reference data may be, for example, an average value of the plurality of data classified into one category. When the learning data and the prediction data are image data, such image data that a pixel value of each pixel is an average value of pixel values of a plurality of image data as the learning data or the prediction data, may be calculated as the reference data. Alternatively, the reference data may be, for example, the data that include a common component, which is common to each of the plurality of data classified into one category.

Figure 6A:
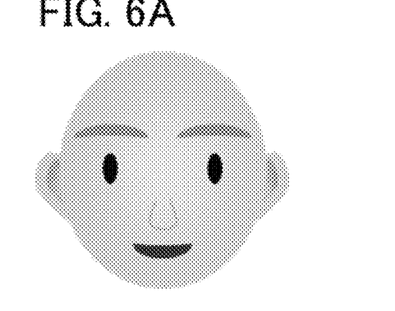
FIG. 6 are diagrams illustrating an example of reference data.
Figure 6B:
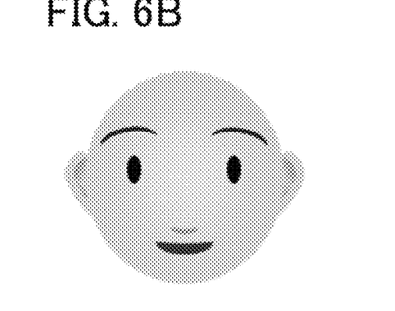

The reference data calculation apparatus 1113 may calculate an image illustrated in FIG. 6A as the reference data, for the male face images A, B, and C illustrated in FIG. 5. Similarly, the reference data calculation apparatus 1113 may calculate an image illustrated in FIG. 6B as the reference data, for the female face images D, E, and F illustrated in FIG. 5. The reference data calculation apparatus 1113 stores the calculated reference data, for example, in a reference data storage apparatus 141 realized by the storage apparatus 14.

The difference data calculation apparatus 1114 calculates difference data by calculating a difference between the reference data and the learning data or the prediction data, by category. The difference data calculation apparatus 1114 calculates difference data illustrated in FIG. 7A by calculating a difference between the image illustrated in FIG. 6A as the reference data and each of the male face images A, B, and C illustrated in FIG. 5. Similarly, the difference data calculation apparatus 1114 calculates difference data illustrated in FIG. 7B by calculating a difference between the image illustrated in FIG. 6B as the reference data and each of the female face images D, E, and F illustrated in FIG. 5. The difference data calculation apparatus 1114 stores the calculated plurality of difference data, for example, in a difference data storage apparatus 241 realized by the storage apparatus 24 of the cloud server 200.

Figure 7A:
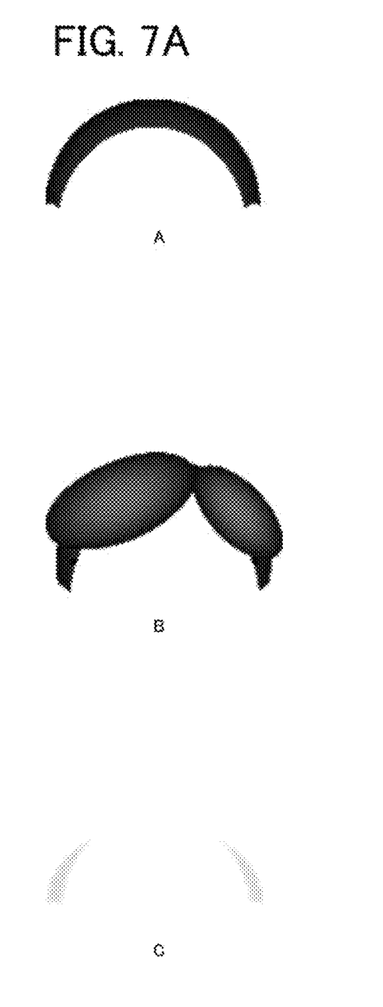
FIG. 7A to FIG. 7B are diagrams illustrating an example of difference data.
Figure 7B:
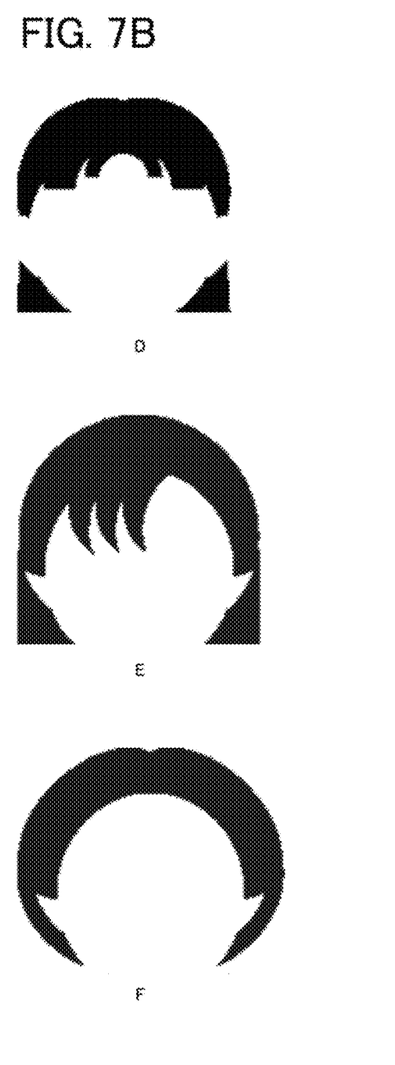

Here, an image A in FIG. 7A is the difference data between the face image A illustrated in FIG. 5 and the image as the reference data illustrated in FIG. 6A. An image B in FIG. 7A is the difference data between the face image B illustrated in FIG. 5 and the image as the reference data illustrated in FIG. 6A. An image C in FIG. 7A is the difference data between the face image C illustrated in FIG. 5 and the image as the reference data illustrated in FIG. 6A. An image D in FIG. 7B is the difference data between the face image D illustrated in FIG. 5 and the image as the reference data illustrated in FIG. 6B. An image E in FIG. 7B is the difference data between the face image E illustrated in FIG. 5 and the image as the reference data illustrated in FIG. 6B. An image F in FIG. 7B is the difference data between the face image F illustrated in FIG. 5 and the image as the reference data illustrated in FIG. 6B.

When the learning data and the prediction data are image data, the difference data calculated by the difference data calculation apparatus 1114 has less high-frequency components than those of the original image data, because it does not include the reference data. Therefore, when a frequency conversion compression (i.e., a process that converts the image data to data in a frequency area and then compresses it, and a compression process that is used, for example, in JPEG (Joint Photographic Experts Group method)) is performed on the difference data, it can be expected that the compressed difference data has a relatively small data size. Therefore, the difference data calculation apparatus 1114 may perform the frequency conversion compression on the calculated difference data, and may store the compressed difference data in the difference data storage apparatus 241. With this configuration, it is possible to reduce a time spent for storing the difference data in the difference data storage apparatus 241, and it is also possible to reduce the consumption of a capacity of the difference data storage apparatus 241.

The client apparatus 100 transmits the reference data stored in the reference data storage apparatus 141 to the data decryption processing 211 of the cloud server 200 when the machine learning process is requested to the cloud server 200.

The combined data calculation apparatus 2111 of the data decryption apparatus 211 combines the reference data transmitted from the client 100 with the difference data stored in advance in the difference data storage apparatus 241 to restore the learning data or the prediction data. Specifically, the combined data calculation apparatus 2111 combines the image as the reference data illustrated in FIG. 6A with the images A, B, and C as the difference data illustrated in FIG. 7A to restore the face images A, B, and C illustrated in FIG. 5. Similarly, the combined data calculation apparatus 2111 combines the image as the reference data illustrated in FIG. 6B with the images D, E, and F as the difference data illustrated in FIG. 7B to restore the face images D, E, and F illustrated in FIG. 5.

The learning engine 212 generates an analytical model by the machine learning that uses the learning data restored by the combined data calculation apparatus 2111. The learning engine 212 stores the generated analytical model, for example, in an analysis result storage apparatus 242 realized by the storage apparatus 24.

The prediction engine 213 stores a prediction result, for example, in the prediction result storage apparatus 243 realized by the storage apparatus 24, wherein the prediction result is obtained, for example, by predicting the category of each of the plurality of image data that are the prediction data by using the prediction data restored or decrypted by the combined data calculation apparatus 2111 and the analytical model stored in the analysis result storage apparatus 242.

Operation

Next, the operation of the system 1 when the machine learning process is performed will be described with reference to a flowchart in FIG. 8.

Figure 8:
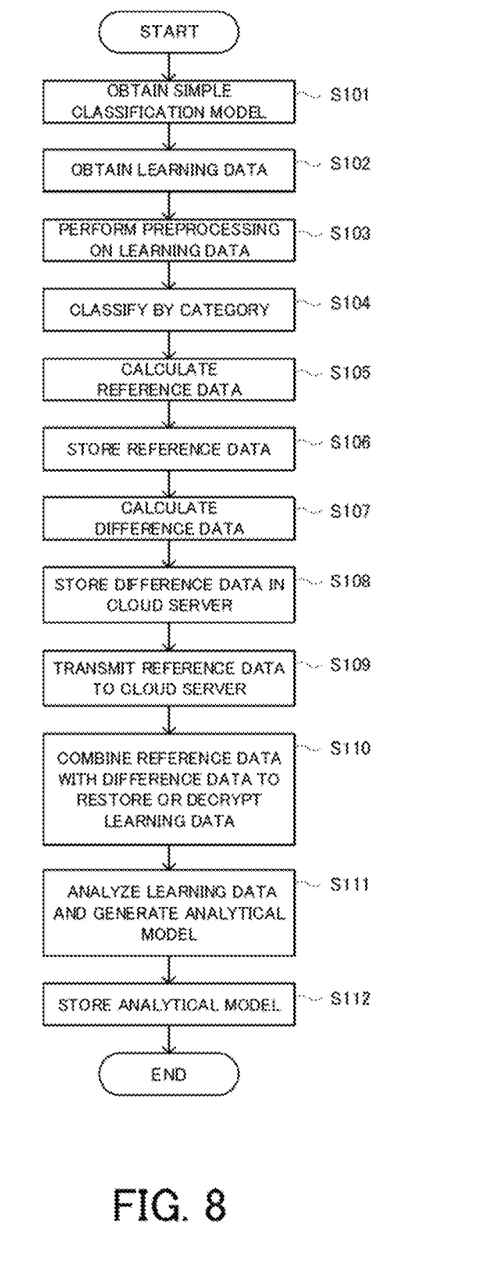
FIG. 8 is a flowchart illustrating the operation of the system when a machine learning process is performed in the system according to the example embodiment.

In FIG. 8, first, the data encryption apparatus 111 of the client apparatus 100 obtains a model (a simple classification model) for the data classification from the simple classification model input apparatus 301 (a step S101). In parallel with the step S101, the data encryption apparatus 111 obtains the learning data from the learning data input apparatus 302 (a step S102).

The data preprocessing apparatus 1111 of the data encryption apparatus 111 performs the predetermined preprocessing on the learning data obtained in the step S102 (a step S103). Then, the simple data classification apparatus 1112 of the data encryption apparatus 111 classifies the learning data by category, by using the simple classification model obtained in the step S101 (a step S104).

Then, the reference data calculation apparatus 1113 of the data encryption apparatus 111 calculates the reference data by category, from the learning data classified by category (a step S105). The reference data calculation apparatus 1113 stores the calculated reference data in the reference data storage apparatus 141 (a step S106) and outputs the calculated reference data to the difference data calculation apparatus 1114 of the data encryption apparatus 111.

The difference data calculation apparatus 1114 calculates the difference data by category, by calculating the difference between the reference data and the learning data (a step S107). The difference data calculation apparatus 1114 stores the calculated plurality of difference data in the difference data storage apparatus 241 of the cloud server 200 (a step S108).

Then, when the machine learning process is requested to the cloud server 200, the client apparatus 100 transmits the reference data stored in the reference data storage apparatus 141 to the data decryption apparatus 211 of the cloud server 200 (a step S109).

The combined data calculation apparatus 2111 of the data decryption apparatus 211 combines the reference data transmitted from the client apparatus 100 with the difference data stored in advance in the difference data storage 241 to restore the learning data (a step S110). The data decryption apparatus 211 outputs the restored learning data to the learning engine 212.

The learning engine 212 generates the analytical model by performing the machine learning process by using the learning data (i.e., by analyzing the learning data) (a step S111). The learning engine 212 stores the generated analytical model in the analysis result storage apparatus 242 (a step S112).

Next, the operation of the system 1 when the analysis that uses the analytical model generated by the machine learning process is performed will be described with reference to a flowchart in FIG. 9.

Figure 9:
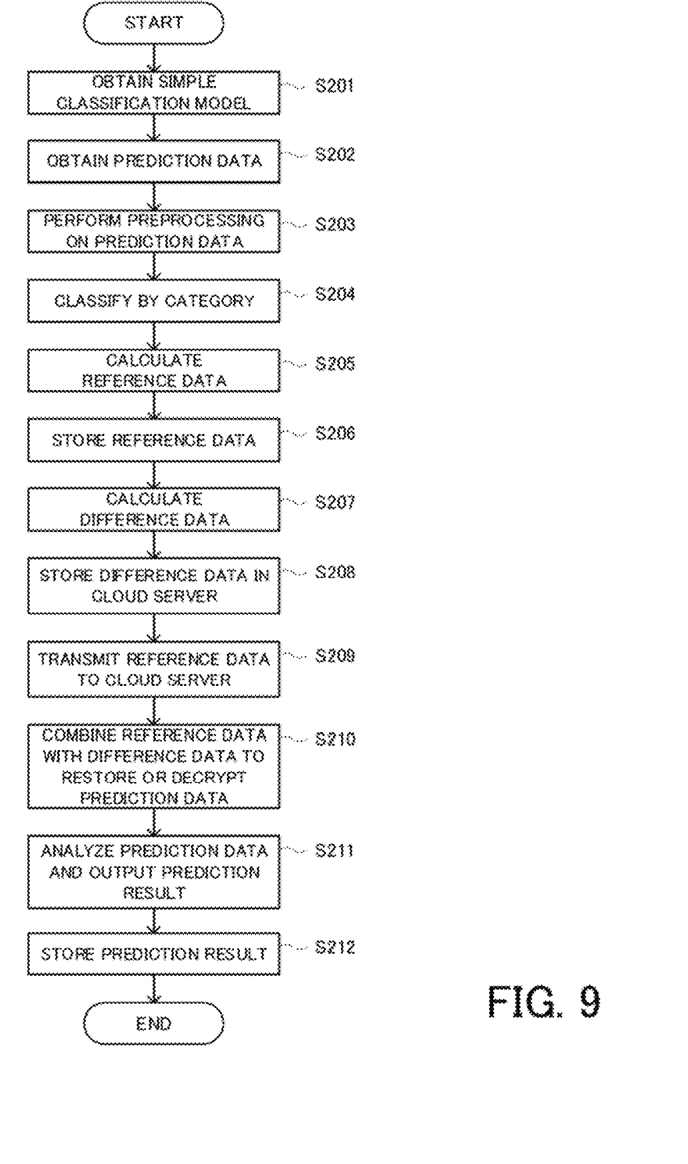
FIG. 9 is a flowchart illustrating the operation of the system when an analysis using an analytical model is performed in the system according to the example embodiment.

In FIG. 9, first, the data encryption apparatus 111 of the client apparatus 100 obtains a model (the simple classification model) for the data classification from the simple classification model input 301 (a step S201). In parallel with the step S201, the data encryption apparatus 111 obtains the predictive data from the predictive data input apparatus 303 (a step S202).

The data preprocessing apparatus 1111 of the data encryption apparatus 111 performs the predetermined preprocessing on the predictive data obtained in the step S202 (a step S203). Then, the simple data classification apparatus 1112 of the data encryption apparatus 111 classifies the prediction data by category, by using the simple classification model obtained in the step S201 (a step S204).

Then, the reference data calculation apparatus 1113 of the data encryption apparatus 111 calculates the reference data by category, from the prediction data classified by category (a step S205). The reference data calculation apparatus 1113 stores the calculated reference data in the reference data storage apparatus 141 (a step S206) and outputs the calculated reference data to the difference data calculation apparatus 1114 of the data encryption 111.

The difference data calculation apparatus 1114 calculates the difference data by category, by calculating the difference between the reference data and the prediction data (a step S207). The difference data calculation apparatus 1114 stores the calculated plurality of difference data in the difference data storage apparatus 241 of the cloud server 200 (a step S208).

Then, when the analysis that uses the analytical model is requested to the cloud server 200, the client apparatus 100 transmits the reference data stored in the reference data storage apparatus 141 to the data decryption apparatus 211 of the cloud server 200 (a step S209).

The combined data calculation apparatus 2111 of the data decryption apparatus 211 combines the reference data transmitted from the client apparatus 100 with the difference data stored in advance in the difference data storage apparatus 241 to restore the predictive data (a step S210). The data decryption apparatus 211 outputs the restored prediction data to the prediction engine 213.

The prediction engine 213 stores a prediction result in the prediction result storage apparatus 243, wherein the prediction result is obtained, for example, by predicting the category of each of the plurality of image data that are the prediction data by using the restored prediction data and the analytical model stored in the analysis result storage apparatus 242 (a step S212).

Incidentally, the "reference data calculation apparatus 1113", the "difference data calculation apparatus 1114" and the "simple data classification apparatus 1112" corresponds to an example of the "generating unit" in Supplementary Note that will be described later. The "difference data calculation apparatus 1114" corresponds to an example of the "storage unit" in Supplementary Note that will be described later.

Technical Effects

In the system 1, as described above, the learning data used for the machine learning process in the cloud server 200 and the prediction data used for the analysis that uses the analytical model are divided into the reference data and the difference data in the client apparatus 100 in the on-premises environment (as a result of which, the learning data and the prediction data are encrypted). Then, the difference data is stored in the difference data storage apparatus 241 of the cloud server 200, while the reference data is stored in the reference data storage apparatus 141 of the client apparatus 100.

Even when the cloud server 200 is attacked and the difference data stored in the difference data storage apparatus 241 is stolen, it is extremely difficult (or it can be said that it is virtually impossible) to restore the original data (i.e., the learning data or the prediction data) only from the difference data. When the machine learning process or the analysis that uses the analytical model is performed, the reference data is transmitted to the cloud server 200. However, the reference data and the original data restored from the reference data and the difference data are temporarily stored, for example, in a cache memory of the cloud server 200, and are deleted from the cloud server 200 after the end of the machine learning process or the like. Therefore, there is very little chance that the original data is stolen from the cloud server 200.

Thus, by dividing the original data (i.e., the learning data or the prediction data) into the reference data and the difference data in the client apparatus 100 in the on-premises environment, it is possible to carry out a security measure in preparation for an information leakage without depending on a cloud service provider. In particular, since the data are not degraded by data encryption (i.e., dividing the data into the reference data and the difference data) and decryption (i.e., restoring the original data from the reference data and the difference data), the accuracy of the machine learning process or the like is not impaired due to the encryption and the decryption.

In addition, since the difference data stored in (in other words, uploaded to) the difference data storage apparatus 241 of the cloud server 200 has a relatively small data size, it is possible to reduce the consumption of the capacity of the difference data storage 241, which is caused by the difference data. Furthermore, when distributed processing is performed in the cloud server 200, it is possible to suppress a communication traffic volume in the distributed processing.

MODIFIED EXAMPLES (1) In the above-described example embodiment, the image data is exemplified as an example of the learning data and the prediction data; however, it is not limited to the image data, but may be, for example, audio data, time-series numerical data, or the like.

Figure 10:
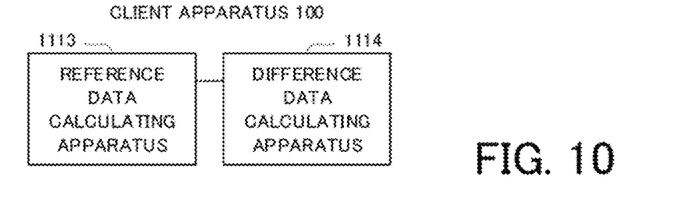
FIG. 10 is a block diagram illustrating another example of the functional block implemented in the CPU of the client apparatus according to the example embodiment.

(2) As illustrated in FIG. 10, while the reference data calculation apparatus 1113 and the difference data calculation apparatus 1114 of the data encryption apparatus 111 are implemented in the CPU 11 of the client apparatus 100, a functional block other than the reference data calculation 1113 and the difference data calculation 1114 may not be implemented. Even in this instance, when the reference data calculation apparatus 1113 performs the step S105 and the step S106 in FIG. 8 and the step S205 and the step S206 in FIG. 9, and the difference data calculation apparatus 1114 performs the step S108 and the step S109 in FIG. 8 and the step S208 and the step S209 in FIG. 9, then, the learning data and the prediction data are divided into the reference data and the difference data (i.e., are encrypted), and the difference data are stored in the difference data storage apparatus 241 of the cloud server 200. As a result, it is possible to carry out the security measure in preparation for the information leakage without depending on the cloud service provider.

Supplementary Note

With respect to the example embodiments described above, the following Supplementary Notes will be further disclosed.

Supplementary Note 1

The system described in Supplementary Note 1 is a system including: a cloud server that is configured to perform a machine learning process; and a client apparatus that is configured to communicate with the cloud server, the client apparatus including: a generating unit that generates one or a plurality of reference data from a plurality of data used for the machine learning and that generates a plurality of difference data, wherein the reference data is a reference for at least a part of the plurality of data, and each difference data indicates a difference between each of the plurality of data and corresponding reference data out of the one or the plurality of reference data; and a storage unit that stores the plurality of difference data in a storage apparatus of the cloud server.

Supplementary Note 2

The system described in Supplementary Note 2 is the system described in Supplementary Note 1, wherein the generating unit classifies each of the plurality of data into one or a plurality of categories, and generates the reference data and the difference data for each of the one or a plurality of categories.

Supplementary Note 3

The system described in Supplementary Note 3 is the system described in Supplementary Note 1 or 2, wherein the storage unit performs frequency conversion compression on the plurality of difference data and then stores them in the storage apparatus.

Supplementary Note 4

The system described in Supplementary Note 4 is the system described in any one of Supplementary Notes 1 to 3, wherein the client apparatus transmits the one or a plurality of reference data to the cloud server when the machine learning process is requested to the cloud server, and the cloud server includes a restoration unit that restores the plurality of data from the plurality of difference data stored in the storage apparatus and the one or a plurality of reference data.

Supplementary Note 5

The client apparatus described in Supplementary Note 5 is a client apparatus that is configured to communicate with a cloud server that is configured to perform machine learning process, the client apparatus including: a generating unit that generates one or a plurality of reference data from a plurality of data used for the machine learning and that generates a plurality of difference data, wherein the reference data is a reference for at least a part of the plurality of data, and each difference data indicates a difference between each of the plurality of data and corresponding reference data out of the one or the plurality of reference data; and a storage unit that stores the plurality of difference data in a storage apparatus of the cloud server.

Supplementary Note 6

The data processing method described in Supplementary Note 6 is a data processing method in a system including: a cloud server that is configured to perform machine learning process; and a client apparatus that is configured to communicate with the cloud server, the data processing method including: a generating step in which one or a plurality of reference data is generated from a plurality of data used for the machine learning and a plurality of difference data are generated, wherein the reference data is a reference for at least a part of the plurality of data, and each difference data indicates a difference between each of the plurality of data and corresponding reference data out of the one or the plurality of reference data; and a storage step in which the plurality of difference data are stored in a storage apparatus of the cloud server.

Supplementary Note 7

The computer program described in Supplementary Note 7 is a computer program that allows a computer to execute the data processing method described in Supplementary Note 6.

Supplementary Note 8

The recording medium described in Supplementary Note 8 is a recording medium on which the computer program described in Supplementary Note 7 is recorded.

The present invention is allowed to be changed, if desired, without departing from the essence or spirit of the invention which can be read from the claims and the entire specification. A system, a client apparatus, a data processing method, a computer program and a recording medium, which involve such changes, are also intended to be within the technical scope of the present invention.

This application is based upon and claims the benefit of priority from Japanese Patent Application No. 2019-051317, filed on Mar. 19, 2019, the disclosure of which is incorporated herein in its entirety by reference.

DESCRIPTION OF REFERENCE CODES

1 . . . System, 100 . . . client apparatus, 111 . . . data encryption apparatus, 141 . . . reference data storage apparatus, 200 . . . cloud server, 211 . . . data decryption apparatus, 212 . . . learning engine, 213 . . . prediction engine, 241 . . . difference data storage apparatus, 242 . . . analysis result storage apparatus, 243 . . . prediction result storage apparatus, 1111 . . . data preprocessing apparatus, 1112 . . . simple data classification apparatus, 1113 . . . reference data calculation apparatus, 1114 . . . difference data calculation apparatus

What is claimed is:

1. A system comprising:
a cloud server that is configured to perform a machine learning process; and
a client apparatus that is configured to communicate with the cloud server, wherein
the client apparatus including a controller programmed to:
classify each of a plurality of data used for the machine learning process into one or more of a plurality of categories;
generate, for each category, reference data from the data classified in the each category, wherein the reference data is a reference for the data classified in the each category;
generate, for each category, difference data, wherein the difference data indicates a difference between the data classified in the each category and the reference data generated for the each category; and
store the difference data generated for each category in a storage apparatus of the cloud server, wherein
the reference data generated for each category is at least one of an average value of the data classified in the each category and a data component common to the data classified in the each category.

2. The system according to claim 1, wherein the controller is programmed to perform frequency conversion compression on the difference data generated for each category before storing the difference data in the storage apparatus.

3. The system according to claim 1, wherein the client apparatus transmits the reference data generated for each category to the cloud server when the cloud service is requested to perform the machine learning process, and
the cloud server is programmed to restore the plurality of data from the difference data generated for each category and stored in the storage apparatus and the reference data generated for each category.

4. The system according to claim 2, wherein the client apparatus transmits the reference data generated for each category to the cloud server when the cloud service is requested to perform the machine learning process, and
the cloud server is programmed to restore the plurality of data from the difference data generated for each category and stored in the storage apparatus and the reference data generated for each category.

5. A data processing method performed by a client apparatus configured to communicate with a cloud server that is configured to perform a machine learning process, the data processing method comprising:
classifying each of a plurality of data used for the machine learning process into one or more of a plurality of categories;
generating, for each category, reference data from the data classified in the each category, wherein the reference data is a reference for the data classified in the each category;
generating, for each category, difference data, wherein the difference data indicates a difference between the data classified in the each category and the reference data generated for the each category; and
storing the difference data generated for each category in a storage apparatus of the cloud server, wherein
the reference data generated for each category is at least one of an average value of the data classified in the each category and a data component common to the data classified in the each category.

6. A non-transitory recording medium storing a computer program executable by a client apparatus configured to communicate with a cloud server that is configured to perform a machine learning process, the computer program executable by the client apparatus to perform a data processing method comprising:
classifying each of a plurality of data used for the machine learning process into one or more of a plurality of categories;
generating, for each category, reference data from the data classified in the each category, wherein the reference data is a reference for the data classified in the each category;
generating, for each category, difference data, wherein the difference data indicates a difference between the data classified in the each category and the reference data generated for the each category; and
storing the difference data generated for each category in a storage apparatus of the cloud server, wherein
the reference data generated for each category is at least one of an average value of the data classified in the each category and a data component common to the data classified in the each category.

* * * * *